United States Patent
Cao

(10) Patent No.: US 11,955,695 B2
(45) Date of Patent: Apr. 9, 2024

(54) ANTENNA MODULE AND TERMINAL DEVICE

(71) Applicant: BEIJING XIAOMI MOBILE SOFTWARE CO., LTD., Beijing (CN)

(72) Inventor: Heng Cao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 190 days.

(21) Appl. No.: 17/383,411

(22) Filed: Jul. 22, 2021

(65) Prior Publication Data

US 2022/0311124 A1  Sep. 29, 2022

(30) Foreign Application Priority Data

Mar. 23, 2021 (CN) .......................... 202110309263.0

(51) Int. Cl.
*H01Q 1/24* (2006.01)
*H01Q 9/04* (2006.01)
*H04B 1/00* (2006.01)
*H04M 1/02* (2006.01)

(52) U.S. Cl.
CPC .......... *H01Q 1/243* (2013.01); *H01Q 9/0442* (2013.01); *H04B 1/006* (2013.01); *H04M 1/026* (2013.01)

(58) Field of Classification Search
CPC ........ H01Q 1/243; H01Q 9/0442; H01Q 1/44; H01Q 5/371; H01Q 5/392; H01Q 9/42; H01Q 1/36; H01Q 5/28; H04B 1/006; H04M 1/026
See application file for complete search history.

(56) References Cited

U.S. PATENT DOCUMENTS

| 2018/0366812 | A1 | 12/2018 | Kim et al. |
| 2019/0148816 | A1 | 5/2019 | Chen et al. |
| 2019/0221943 | A1* | 7/2019 | Wu .................. H01Q 5/371 |

FOREIGN PATENT DOCUMENTS

CN  111029747 A  4/2020

OTHER PUBLICATIONS

Extended European Search Report in Application No. 21188566.0, dated Jan. 4, 2022.

* cited by examiner

*Primary Examiner* — Hai V Tran
*Assistant Examiner* — Michael M Bouizza
(74) *Attorney, Agent, or Firm* — Syncoda LLC; Feng Ma

(57) ABSTRACT

An antenna module includes: a middle frame, wherein a bezel of the middle frame is provided with an opening for providing a functional module, the bezel is formed with a first conductive strip on one side of the opening, and the bezel is formed with a second conductive strip on the other side of the opening, wherein the first conductive strip and/or the second conductive strip is/are connected to a feed line, to be used as an antenna radiator for transmitting and receiving radio signals. The first conductive strip and the second conductive strip are formed by the bezel at the opening for providing the functional module, to transmit and receive the radio signals, such that the bezel at the opening can be multiplexed to transmit and receive the radio signals in a case that space is limited.

20 Claims, 8 Drawing Sheets

ANTENNA MODULE AND TERMINAL DEVICE

CROSS-REFERENCE TO RELATED APPLICATION

This application claims priority to Chinese Patent Application No. 202110309263.0 filed on Mar. 23, 2021, the disclosure of which is hereby incorporated by reference in its entirety.

BACKGROUND

With the arrival of the 6G era, there are more and more types of antennas built in terminal devices, and more and more frequency bands for terminal devices to transmit and receive radio signals.

SUMMARY

The present disclosure relates generally to communication technologies, and more specifically to an antenna module and a terminal device.

Various embodiments of the present disclosure provide an antenna module and a terminal device.

In a first aspect of embodiments of the present disclosure, there is provided an antenna module, including:
a middle frame, wherein a bezel of the middle frame is provided with an opening for providing a functional module, the bezel is formed with a first conductive strip on one side of the opening, and the frame is formed with a second conductive strip on the other side of the opening,
wherein the first conductive strip and/or the second conductive strip is/are connected to a feed line, to be used as an antenna radiator for transmitting and receiving radio signals.

In some embodiments, the first conductive strip is connected to the feed line, and
the second conductive strip is coupled to the first conductive strip, together to transmit and receive the radio signals.

In some embodiments, a first end of the first conductive strip is connected to a middle frame body, and a first gap is provided between a second end of the first conductive strip and the middle frame body, and
a second gap is provided between a first end of the second conductive strip and the middle frame body, and the projection of the first gap on the second gap at least partially coincides with the second gap.

In some embodiments, the first conductive strip is connected to the feed line, and the distance from a position of a connection point, at which the feed line is connected to the first conductive strip, on the first conductive strip to the first gap is one quarter of a wavelength of the radio signal of a first sub-frequency band in a first frequency band transmitted and received by the antenna module, and
the length of the first conductive strip is one quarter of a wavelength of a radio signal of a second sub-frequency band in the first frequency band transmitted and received by the antenna module.

In some embodiments, a third gap is provided between a second end of the second conductive strip and a middle frame body, and
the second conductive strip is grounded through a tuning assembly.

In some embodiments, the tuning assembly includes: a switch element,
wherein, when the switch element is in different switching states, the tuning assembly has different impedances, and the corresponding antenna module transmits and receives radio signals of different frequency bands.

In some embodiments, the switch element includes: a first controlled switch, a second controlled switch, a third controlled switch and a fourth controlled switch, and the first controlled switch, the second controlled switch, the third controlled switch and the fourth controlled switch are connected in parallel between the second conductive strip and a ground line,
when the fourth controlled switch is in a turn-on state and the second controlled switch, the third controlled switch and the first controlled switch are all in a turn-off state, the tuning assembly has a first impedance, and the antenna module is configured to transmit and receive radio signals in a first frequency band,
when the first controlled switch, the second controlled switch, the third controlled switch and the fourth controlled switch are all in a turn-on state, the tuning assembly has a second impedance, and the antenna module is configured to transmit and receive radio signals in a second frequency band,
when the first controlled switch is in a turn-on state and the second controlled switch, the third controlled switch and the fourth controlled switch are all in a turn-off state, the tuning assembly has a third impedance, and the antenna module is configured to transmit and receive radio signals in a third frequency band,
when the second controlled switch is in a turn-on state and the first controlled switch, the third controlled switch and the fourth controlled switch are all in a turn-off state, the tuning assembly has a fourth impedance, and the antenna module is configured to transmit and receive radio signals in a fourth frequency band, and
when the third controlled switch is in a turn-on state and the second controlled switch, the first controlled switch and the fourth controlled switch are all in a turn-off state, the tuning assembly has a fifth impedance, and the antenna module is configured to transmit and receive radio signals in a fifth frequency band.

In some embodiments, the tuning assembly further includes:
a first inductor, connected between the first controlled switch and the ground line;
a second inductor, connected between the second controlled switch and the ground line, wherein an inductance value of the second inductor is different from that of the first inductor; and
a capacitor, connected between the third controlled switch and the ground line.

In some embodiments, the distance from a position at which the tuning assembly is connected to the second conductive strip to the third gap is one quarter of a wavelength of a radio signal in a second frequency band, a third frequency band, a fourth frequency band or a fifth frequency band transmitted and received by the antenna module.

In a second aspect of the embodiments of the present disclosure, there is provided a terminal device including: the antenna module as described in the first aspect above mentioned.

In some embodiments, the terminal device further includes: a functional module,
wherein the functional module is exposed by the opening in the bezel of the antenna module, and the functional module includes at least a key module.

In some embodiments, the key module includes: a volume button for adjusting volume or a power button for powering on and off.

Various embodiments of the present disclosure can have one or more of the following advantages.

In the embodiments of the present disclosure, the antenna module includes: a middle frame, wherein the bezel of the middle frame is provided with an opening for providing a functional module, the bezel is formed with a first conductive strip on one side of the opening, and the bezel is formed with a second conductive strip on the other side of the opening, wherein the first conductive strip and/or the second conductive strip is/are connected to a feed line to be used as an antenna radiator for transmitting and receiving radio signals. In this way, in the embodiments of the present disclosure, the first conductive strip and the second conductive strip formed by the bezel at the opening for providing the functional module, to transmit and receive the radio signals, such that the bezel at the opening can be multiplexed to transmit and receive the radio signals in the case that the space is limited, such that the antenna module may support more antenna frequency bands without any separate antenna, which reduces the space of the terminal device occupied by the antenna module and improves space utilization of the terminal device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Due to the limitation of the size of a terminal device, the space for the terminal device to accommodate different types of antennas is increasingly in conflict with the increasing number of antenna frequency bands. For example, the length of the conductive bezel is limited, and the antennas formed on the conductive bezel can only support a limited number of antenna frequency bands, which cannot meet the increasing demand for antenna frequency bands.

Figure 1:
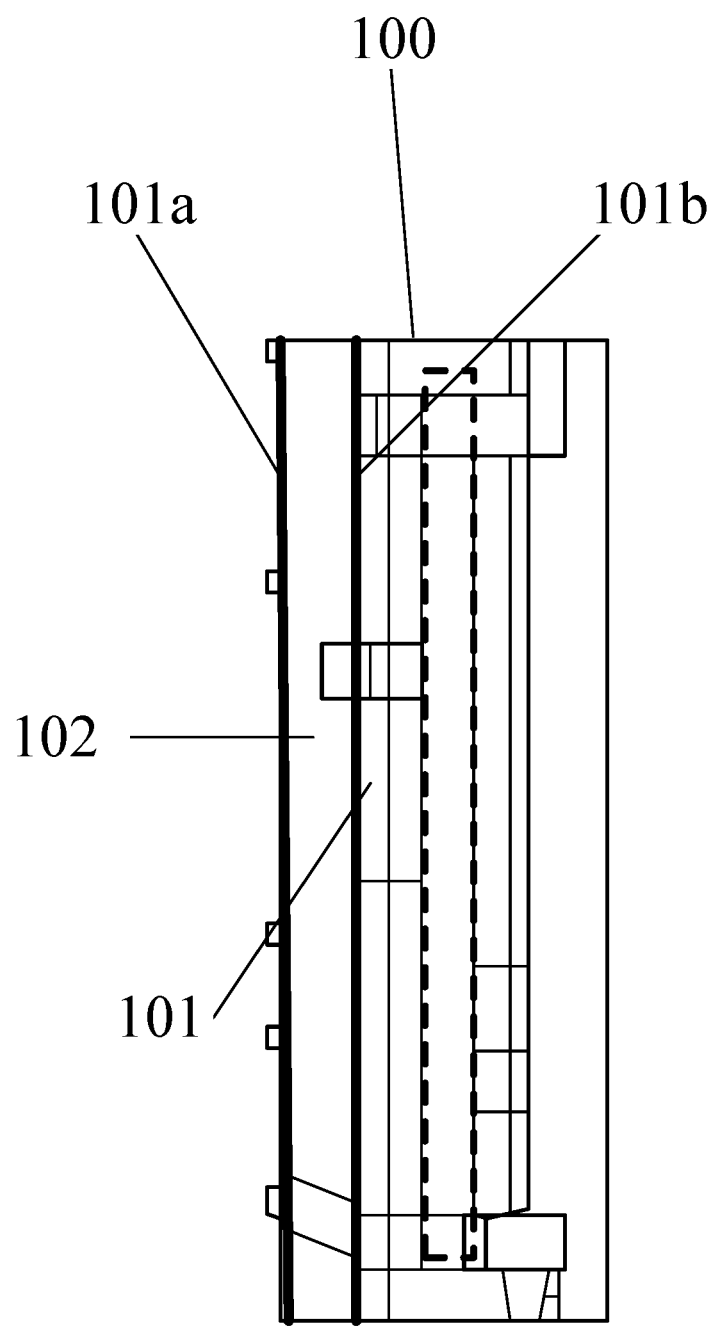
FIG. 1 is a first schematic diagram illustrating an antenna module according to some embodiments of the present disclosure.
Figure 5:
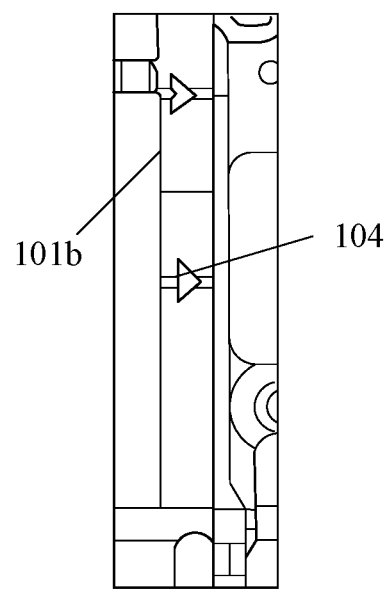
FIG. 5 is a fourth schematic diagram illustrating an antenna module according to some embodiments of the present disclosure.

FIG. 1 is a first structural schematic diagram illustrating an antenna module according to some embodiments of the present disclosure. As shown in FIG. 1, the antenna module includes:

a middle frame 100, wherein a bezel 101 of the middle frame is provided with an opening 102 for providing a functional module, and the bezel 101 is formed with a first conductive strip 101a on one side of the opening 102 and is formed with a second conductive strip 101b on the other side of the opening 102; and the first conductive strip 101a and/or the second conductive strip 101b is/are connected to a feed line 104 to be used as an antenna radiator for transmitting and receiving radio signals as shown in FIG. 5.

The above-mentioned antenna module is used in a terminal device, and can be applied to wireless communication scenarios such as Bluetooth (BT), wireless fidelity (Wi-Fi), Universal Mobile Telecommunications System (UMTS), or Long-Term Evolution (LTE). The terminal device may be a wearable electronic device or a mobile terminal. The mobile terminal includes a mobile phone, a laptop or a tablet computer; and the wearable electronic device includes a smart watch or a smart bracelet, which is not limited in the embodiments of the present disclosure.

The above-described middle frame includes a bezel provided on the periphery of the terminal device, where the bezel has an opening for providing a functional module. The functional module includes: a key module for supporting key operations, or a card tray for receiving different subscriber identity module cards, which is not limited in the embodiments of the present disclosure.

In the embodiments of the present disclosure, the size and shape of the opening need to match those of the functional module. For example, the size of the functional module may be set smaller than or equal to that of the opening; and the shape of the functional module may be set similar or identical to that of the opening, which is not limited by the embodiments of the present disclosure.

The foregoing bezel is formed with the first conductive strip on one side of the opening and is formed with the second conductive strip on the other side of the opening, which includes: the first conductive strip and the second conductive strip are oppositely provided on both sides of the opening; or, the first conductive strip and the second conductive strip are adjacently provided on both sides of the opening, which is not limited by the embodiments of the present disclosure.

In the embodiments of the present disclosure, the first conductive strip and the second conductive strip are provided to be spaced apart from each other, that is, there is a slit between the first conductive strip and the second conductive strip. The slit may be set according to the actual situation, for example, the width of the slit may be set in a range of 0.2 mm to 0.6 mm.

When the first conductive strip and the second conductive strip are provided oppositely on both sides of the opening, a projection of the first conductive strip on the second conductive strip may coincide completely with the second conductive strip, or may coincide partially with the second conductive strip, which is not limited by the embodiments of the present disclosure.

In the embodiments of the present disclosure, the first conductive strip and the second conductive strip may be conductive strips of the same shape, for example, both the first conductive strip and the second conductive strip may be a rectangular shape; or they may be conductive strips of different shapes as well, for example, the first conductive strip may be a circular shape, and the second conductive strip may be a rectangular shape, which is not limited by the embodiments of the present disclosure.

In some embodiments, both the first conductive strip and the second conductive strip have a length in a range of 18 mm to 22 mm.

Compared with the fact that an existing antenna occupies a length of 35 mm on a metal frame, both the lengths of the first conductive strip and the second conductive strip are between 18 mm and 22 mm in the embodiments of the present disclosure, which, on the one hand, can re-purpose the bezel at the opening as the antenna radiator for transmitting and receiving radio signals, and on the other hand, can shorten the length of the bezel occupied by the antenna module in the case of transmitting and receiving the radio signals, which can reduce the space of the terminal device occupied by the antenna module and improve the space utilization of the terminal device.

The above-described feed line is configured to transmit electrical signals. When the antenna module transmits the radio signal, the feed line transmits a first electrical signal generated by a radio frequency module to the first conductive strip and/or the second conductive strip, such that the first conductive strip and/or the second conductive strip radiates the radio signal with the excitation of the first electrical signal; and when the antenna module receives the radio signal, the feed line transmits a second electrical signal converted by the first conductive strip and/or the second conductive strip to the radio frequency module, so as to realize receiving of the radio signal.

It should be noted that the radio frequency module includes: a first amplifier, an antenna switch, a filter, a duplexer and a second amplifier. The first amplifier is configured to realize amplifying of the electrical signals in a signal outputting channel. The antenna switch is configured to realize switching between the receiving and transmitting of the electrical signals and between different frequency bands of the antenna. The filter is configured to pass signals in a specific frequency band, and filter out signals outside the specific frequency band. The duplexer is configured to isolate the transmitted electrical signals from the received electrical signals, such that the antenna can function properly when receiving and transmitting the radio signals simultaneously. The second amplifier is configured to realize amplifying of electrical signals in a signal reception channel. In this way, the radio frequency module can realize the receiving and transmitting of the electrical signals, allowing the antenna radiator to transmit and receive the radio signals better.

The first conductive strip and/or the second conductive strip is/are connected to the feed line, which includes: both the first conductive strip and the second conductive strip are connected to the feed line; or, the first conductive strip is connected to the feed line; or, the second conductive strip is connected to the feed line.

When both the first conductive strip and the second conductive strip are connected to the feed line, the first conductive strip and the second conductive strip can receive the electrical signals transmitted by the feed line simultaneously, and are used as the antenna radiator together for transmission and receiving of the radio signals.

When the first conductive strip is connected to the feed line, the second conductive strip is coupled to the first conductive strip to form the antenna radiator for transmitting and receiving the radio signals.

When the second conductive strip is connected to the feed line, the first conductive strip is coupled to the second conductive strip to form the antenna radiator for transmitting and receiving the radio signal.

In the embodiments of the present disclosure, the bezel is formed with the first conductive strip on one side of the opening, and the bezel is formed with the second conductive strip on the other side of the opening; and the first conductive strip and/or the second conductive strip is/are connected to the feed line to be used as the antenna radiator for transmitting and receiving the radio signals. In this way, in the embodiments of the present disclosure, the first conductive strip and the second conductive strip are formed by the bezel at the opening for providing the functional module, to transmit and receive the radio signals, such that the bezel at the opening can be additionally purposed to transmit and receive the radio signals in the case that the space is limited, and more antennas can be disposed, such that the antenna module may support more antenna frequency bands without disposing any separate antenna, which can reduce the space of the terminal device occupied by the antenna module and improve the space utilization of the terminal device.

Figure 2A:
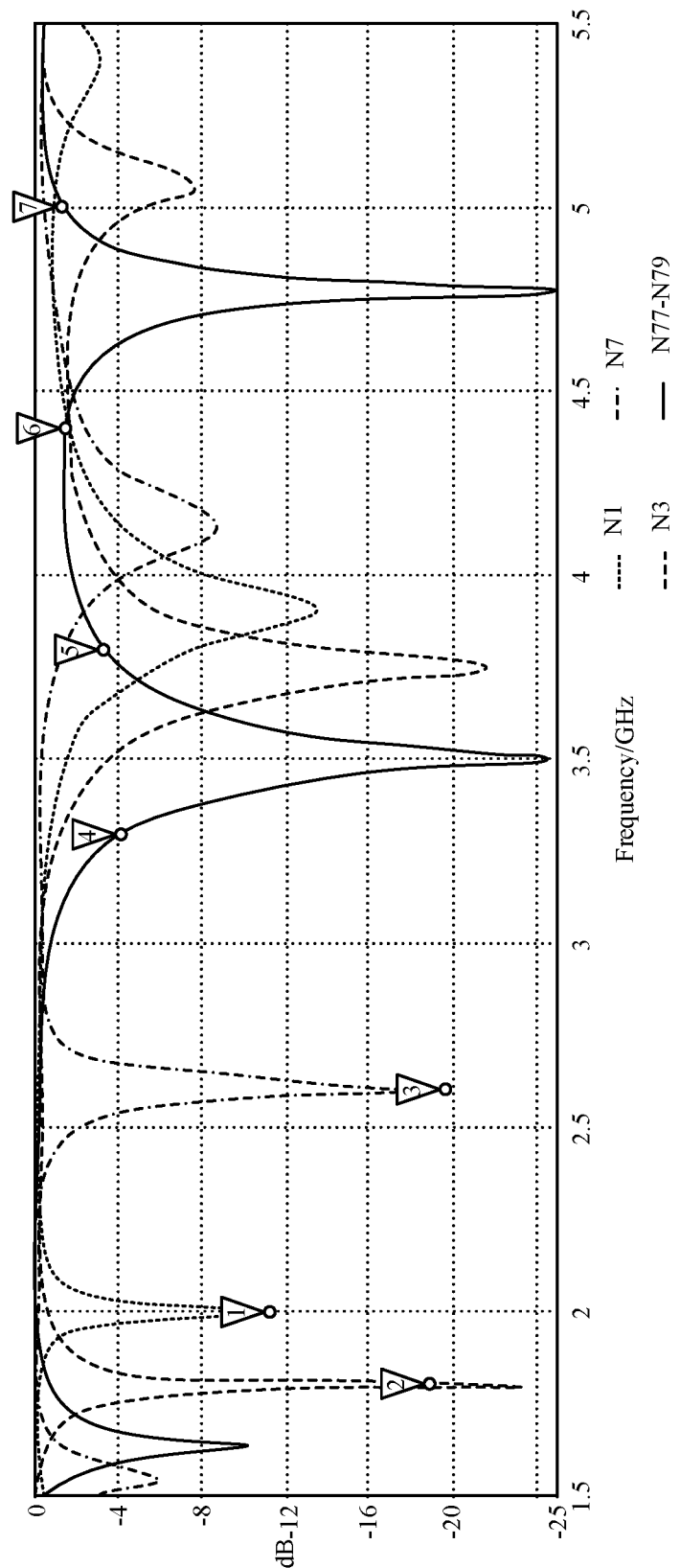
FIG. 2A is a schematic diagram illustrating return loss of an antenna module when transmitting and receiving different frequency bands according to some embodiments of the present disclosure.

FIG. 2A is a diagram of return loss of the antenna module when transmitting and receiving radio signals in different frequency bands. As shown in FIG. 2A, the return loss of the antenna corresponding to reference numeral 1 is −11.286 dB when transmitting and receiving radio signals at 1.996 GHz in a frequency band of N1; the return loss of the antenna corresponding to reference numeral 2 is −19.06 dB when transmitting and receiving radio signals at 1.8029 GHz in a frequency band of N3; the return loss of the antenna corresponding to reference numeral 3 is −19.605 dB when transmitting and receiving radio signals at 2.6043 GHz in a frequency band of N7; and the return loss of the antenna corresponding to reference numeral 4 to 7 is in a range of −0.3406 dB to −4.3911 dB when transmitting and receiving signals in frequency bands of N77 to N79. It can be seen that, if the first and second conductive strips at the opening are additionally purposed and used as the antenna radiator, the return loss of the antenna radiator when transmitting and receiving radio signals in different frequency bands can meet the antenna design requirements.

Figure 2B:
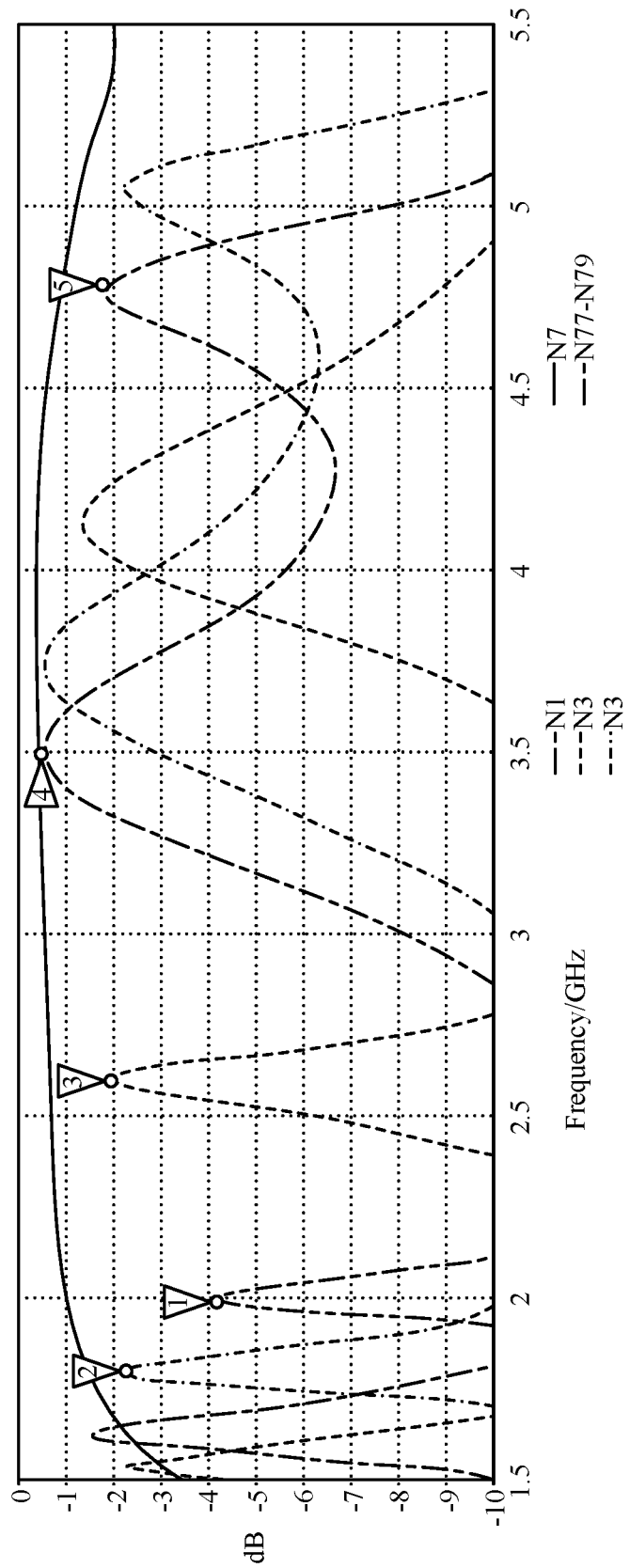
FIG. 2B is a schematic diagram illustrating the transmitting and receiving efficiency of an antenna module when transmitting and receiving different frequency bands according to some embodiments of the present disclosure.

FIG. 2B is a diagram illustrating the transmitting and receiving efficiency of the antenna when transmitting and receiving radio signals in different frequency bands. As shown in FIG. 2B, the transmitting and receiving efficiency of the antenna corresponding to the reference numeral 1 is −4.2684 dB when transmitting and receiving radio signals at 1.9888 GHz in the frequency band of N1; the transmitting and receiving efficiency of the antenna corresponding to the reference numeral 2 is −2.2516 dB when transmitting and receiving radio signals at 1.8019 GHz in the frequency band of N3; the transmitting and receiving efficiency of the antenna corresponding to the reference numeral 3 is −2.1716 dB when transmitting and receiving radio signals at 2.5959 GHz in the frequency band of N7; and the transmitting and receiving efficiency of the antennas corresponding to the reference numerals 4 and 5 is in a range of −0.47809 dB to −1.8422 dB when transmitting and receiving radio signals in the frequency bands of N77 to N79. It can be seen that if the first and second conductive strips at the opening are additionally purposed and used as the antenna radiator, the transmitting and receiving efficiency of the antenna radiator when transmitting and receiving radio signals in different frequency bands can meet the antenna design requirements.

In some embodiments, the first conductive strip is connected to the feed line; and the second conductive strip is coupled to the first conductive strip to transmit and receive the radio signals.

In the embodiments of the present disclosure, a connection point, at which the feed line is connected to the first conductive strip, may be a feed point. When the feed line transmits an electrical signal to the first conductive strip through the feed point, the first conductive strip radiates the radio signal with the excitation of the electrical signal.

When the first conductive strip converts an alternating current into an alternating magnetic field, that is, when the first conductive strip radiates the radio signal, the second conductive strip can generate an alternating current under the action of the alternating magnetic field and can generate an alternating magnetic field based on the alternating current, such that the second conductive strip can transmit and receive the radio signal together with the first conductive strip. In other words, the second conductive strip and the first conductive strip can together transmit and receive the radio signals by magnetic coupling.

Compared with the situation in which only the first conductive strip transmits and receives the radio signals, in the embodiments of the present disclosure, the second conductive strip and the first conductive strip are coupled to together transmit and receive the radio signals, which enables the antenna module to support more frequency bands, and improves the transmitting and receiving performance of the antenna module as well.

Figure 3:
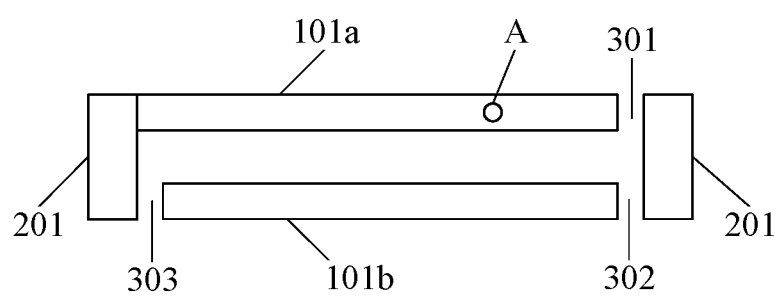
FIG. 3 is a second schematic diagram illustrating an antenna module according to some embodiments of the present disclosure.

In some embodiments, as shown in FIG. 3, a first end of the first conductive strip 101*a* is connected to a middle frame body 201, and a first gap 301 is provided between a second end of the first conductive strip 101*a* and the middle frame body 201.

A second gap 302 is provided between a first end of the second conductive strip 101*b* and the middle frame body, and a projection of the first gap 301 on the second gap 302 at least partially coincides with the second gap 302.

The above-mentioned middle frame includes the middle frame body which may be a frame other than the first conductive strip and the second conductive strip on the middle frame. The middle frame body is connected to a ground line, and the electrical signals of the first conductive strip may flow back to the ground through the middle frame body when the first conductive strip transmits and receives the radio signals.

In the embodiments of the present disclosure, the middle frame body may include a conductive frame, and the first gap is provided between the second end of the first conductive strip and the middle frame body. Correspondingly, the conductive frame of the middle frame body at the first gap may be used as a radiation branch for transmitting and receiving radio signals together with the first conductive strip.

The second gap is provided between the first end of the above-mentioned second conductive strip and the middle frame body. Correspondingly, the conductive frame of the middle frame body at the second gap may be used as another radiation branch for transmitting and receiving radio signals together with the second conductive strip.

In the embodiments of the present disclosure, the projection of the first gap on the second gap at least partially coincides with the second gap, which includes: the first gap completely coincides with the second gap; or, the first gap partially coincides with the second gap. That is, the first gap and the second gap may be the same gap, or may be different gaps, which is not limited by the embodiments of the present disclosure.

In some embodiments, both the width of the first gap and the width of the second gap may be in a range of 1.5 mm to 2 mm.

In the embodiments of the present disclosure, the first and second conductive strips can radiate radio signals outwardly through the first and second gaps, and can transmit and receive radio signals together with the conductive frame of the middle frame body at the first gap and the conductive frame of the middle frame body at the second gap as well, which can expand the radiation area of the antenna module and improve the transmitting and receiving efficiency of the antenna module.

In some embodiments, as shown in FIG. 3, the first conductive strip 101*a* is connected to the feed line; and the distance between the position of a connection point A, at which the feed line is connected to the first conductive strip 101*a*, on the first conductive strip 101*a* to the first gap 301 is one quarter of a wavelength of a radio signal of a first sub frequency band in a first frequency band transmitted and received by the antenna module.

The length of the first conductive strip 101*a* is one quarter of the wavelength of a radio signal of a second sub-frequency band in the first frequency band transmitted and received by the antenna module.

In the embodiments of the present disclosure, the connection point, at which the feed line is connected to the first conductive strip, may be a feed point, and the distance between the feed point and the first gap is set as one quarter of the wavelength of the radio signal of the first sub-frequency band, which can improve the transmitting and receiving efficiency of the antenna module in the first sub-frequency band.

In some embodiments, the first frequency band may be a fifth generation mobile communication frequency band, and the first sub-frequency band includes, but is not limited to, a frequency band of N79. The distance from the feed point to the first gap may be in a range of 4 mm to 6 mm.

In some embodiments, the distance from the feed point to the first gap is 5 mm.

In the embodiments of the present disclosure, setting the length of the first conductive strip to be one quarter of the wavelength of the radio signal of the second sub-frequency band can improve the transmitting and receiving efficiency of the antenna module in the second sub-frequency band.

In some embodiments, the second sub-frequency band includes, but is not limited to, a frequency band of N77.

In the embodiments of the present disclosure, it is possible to improve the transmitting and receiving efficiency of transmitting and receiving the radio signals in the frequency bands of N77 to N79, by setting the location of the feed point and the length of the first conductive strip.

Figure 4:
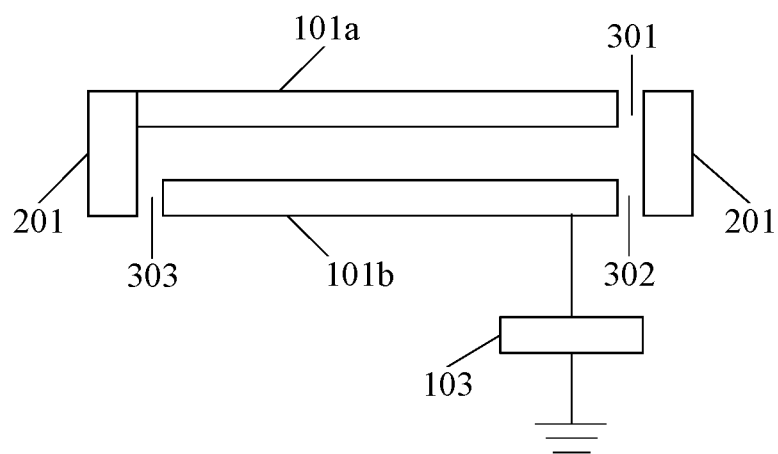
FIG. 4 is a third schematic diagram illustrating an antenna module according to some embodiments of the present disclosure.

In some embodiments, as shown in FIGS. 4 and 5, a third gap 303 is provided between the second end of the second conductive strip 101b and the middle frame body 201.

The second conductive strip 101b is grounded through a tuning assembly 103.

FIGS. 1 and 5 are views of the above-mentioned antenna module of embodiments of the present disclosure as viewed from the front and side, respectively. The above-mentioned feed line 104 is shown in FIG. 5.

In the embodiments of the present disclosure, the third gap is provided between the second end of the second conductive strip and the middle frame body, and correspondingly, the conductive frame of the middle frame body at the third gap may be used as a radiating branch for transmitting and receiving radio signals together with the second conductive strip.

The above-described third gap and the second gap are located on opposite sides of the second conductive strip. The third gap may be the same gap as the second gap, or may be a different gap from the second gap, which is not limited by the embodiments of the present disclosure.

In some embodiments, the third gap may have a width in the range of 1.5 mm to 2 mm.

In the embodiments of the present disclosure, the antenna module includes the tuning assembly through which the second conductive strip is grounded. The tuning assembly may have different impedances, correspondingly, the frequency bands in which the antenna module composed of the first conductive strip and the second conductive strip transmits and receives radio signals, may be different as well.

It should be noted that the tuning assembly may be a specific type of packaged tuner, or may be an unpackaged tuner composed of one or more components, which is not limited by the embodiments of the present disclosure. For example, the tuning assembly includes, but is not limited to, QAT3550.

In the embodiments of the present disclosure, connecting the tuning assembly to the second conductive strip and connecting the feed line to the first conductive strip can realize that the tuning assembly to allow the antenna module to transmit and receive radio signals in different frequency bands by tuning the impedance.

In some embodiments, the tuning assembly includes: a switch element.

When the switch element is in different switching states, the tuning assembly may have different impedances. Correspondingly, the antenna module may transmit and receive radio signals in different frequency bands.

In the embodiments of the present disclosure, the switch element may include a plurality of controlled switches. The greater the number of the controlled switches is, the greater the number of different switching states that can be combined will be, thus the greater the number of different impedances that can be tuned by the tuning assembly will be. In other words, in practice, the number of controlled switches in the switch element can be set according to actual requirements, to meet the need for tuning different impedances.

In some embodiments, when the number of the controlled switches is 3, through combination, 8 switching states may be obtained, thus the tuning assembly may tune 8 different impedances; and when the number of the controlled switches is 4, through combination, 16 switching states may be obtained, thus the tuning assembly may have 16 different impedances.

The above-described second conductive strip is grounded by the tuning assembly and the tuning assembly may have different impedances.

Correspondingly, the antenna module may have different impedances as well, thus the frequency band of the radio signals transmitted and received by the antenna module will switch among different frequency bands. In other words, in the embodiments of the present disclosure, the antenna may transmit and receive radio signals of more frequency bands by adjusting the switching state of the switch element in the tuning assembly.

In some embodiments, the antenna can transmit and receive radio signals in the frequency band of N1, N3, N7, N32, or N77 to N79, by adjusting the five different switching states of the switch element in the tuning assembly, which is not limited by the embodiments of the present disclosure.

In the embodiments of the present disclosure, the tuning assembly includes the switch element, and the tuning assembly has different impedances when the switch element is in different switching states, correspondingly, the antenna module transmits and receives radio signals of different frequency bands. In this way, in the embodiments of the present disclosure, the antenna module can support more antenna frequency bands, based on the adjustment of the switching state of the tuning assembly, to meet the increasing demand for the antenna frequency bands.

Figure 6:
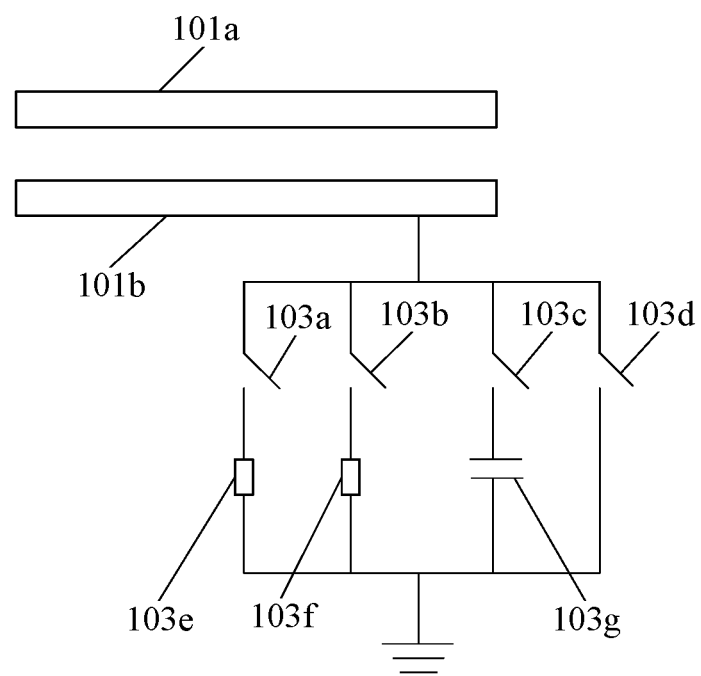
FIG. 6 is a fifth schematic diagram illustrating an antenna module according to some embodiments of the present disclosure.

In some embodiments, as shown in FIG. 6, the switch element includes: a first controlled switch 103a, a second controlled switch 103b, a third controlled switch 103c and a fourth controlled switch 103d; and the first controlled switch 103a, the second controlled switch 103b, the third controlled switch 103c and the fourth controlled switch 103d are connected in parallel between the second conductive strip 101b and the ground line.

When the fourth controlled switch 103d is in a turn-on state, and the second controlled switch 103b, the third controlled switch 103c and the first controlled switch 103a are all in a turn-off state, the tuning assembly has a first impedance; and the antenna module is configured to transmit and receive radio signals in the first frequency band.

When the first controlled switch 103a, the second controlled switch 103b, the third controlled switch 103c and the fourth controlled switch 103d are all in a turn-off state, the tuning assembly has a second impedance, and the antenna module is configured to transmit and receive radio signals in the second frequency band.

When the first controlled switch 103a is in a turn-on state, and the second controlled switch 103b, the third controlled switch 103c and the fourth controlled switch 103d are all in a turn-off state, the tuning assembly has a third impedance, and the antenna module is configured to transmit and receive radio signals in the third frequency band.

When the second controlled switch 103b is in a turn-on state, and the first controlled switch 103a, the third controlled switch 103c and the fourth controlled switch 103d are all in a turn-off state, the tuning assembly has a fourth impedance; and the antenna module is configured to transmit and receive radio signals in the fourth frequency band.

When the third controlled switch 103c is in a turn-on state, and the second controlled switch 103b, the first controlled switch 103a and the fourth controlled switch 103d are all in a turn-off state, the tuning assembly has a fifth impedance; and the antenna module is configured to transmit and receive radio signals in the fifth frequency band.

In the embodiments of the present disclosure, the switch element includes four controlled switches connected in parallel, and 16 corresponding switching states may be obtained through combination by different switching states of the four controlled switches. Moreover, since the tuning assembly has different impedances corresponding to different switching states, the tuning assembly may have 16 kinds of different impedances accordingly.

In the process of adjusting the tuning assembly, in addition to adjusting the tuning assembly to have the first impedance, the second impedance, the third impedance, the fourth impedance and the fifth impedance as described above, the tuning assembly may be adjusted to have other impedances than the first impedance, the second impedance, the third impedance, the fourth impedance and the fifth impedance, so as to obtain the corresponding transmitting and receiving frequency bands of the radio signals.

For example, when the first controlled switch, the second controlled switch, the third controlled switch and the fourth controlled switch are all in a turn-off state, the tuning assembly has a sixth impedance, and the radio signals are transmitted and received in a frequency band of 1920 MHz to 1980 MHz.

It should be noted that in the actual application process, the impedances corresponding to different switching states of the specific tuning assembly and the transmitting and receiving frequency bands of the radio signals corresponding to the impedances are subject to actual adjusting result, which are not limited by the embodiments of the present disclosure.

In the embodiments of the present disclosure, the first controlled switch, the second controlled switch, the third controlled switch and the fourth controlled switch, may be electronic components, the switching states of which are controlled based on a control signal of a control circuit. For example, each of the first controlled switch, the second controlled switch, the third controlled switch and the fourth controlled switch may be a MOS transistor, which has a gate electrode connected to a connection terminal of the control circuit, and a source electrode and a drain electrode whose switching states are turn-on or turn-off when a corresponding voltage is input to the gate electrode.

For example, the switching state of the source electrode and the drain electrode of the MOS transistor is in the turn-on state when the corresponding voltage input to the gate electrode is a first voltage, and the switching state of the source electrode and the drain electrode of the MOS transistor is in the turn-off state when the corresponding voltage input to the gate electrode is a second voltage, wherein the first voltage is higher than the second voltage.

In some embodiments, as shown in FIG. 6, the tuning assembly 103 further includes the following impedance components:
- a first inductor 103e, connected between the first controlled switch 103a and the ground line;
- a second inductor 103f, connected between the second controlled switch 103b and the ground line, wherein the second inductor 103f has an inductance value different from that of the first inductor 103e; and
- a capacitor 103g, connected between the third controlled switch 103c and the ground line.

In the embodiments of the present disclosure, the switching state of each of the first controlled switch, the second controlled switch and the third controlled switch allows the corresponding impedance component connected in series to be connected to the tuning assembly respectively, which in turn allows the tuning assembly to have different impedances.

In practical design, a plurality of first inductors, a plurality of second inductors or a plurality of capacitors may be provided to meet different impedance matching for different frequency bands, so as to improve the transmitting and receiving efficiency of the antenna in the frequency bands.

In some embodiments, the distance from a connection position, where the tuning assembly is connected to the second conductive strip, to the third gap is one quarter of a wavelength of the radio signal in the second frequency band, the third frequency band, the fourth frequency band, or the fifth frequency band transmitted and received by the antenna module.

In the embodiments of the present disclosure, the distance from the connection position, at which the tuning assembly is connected to the second conductive strip, to the third gap is set to be one quarter of the wavelength of the radio signal in the first frequency band, the second frequency band, the third frequency band, or the fourth frequency band, which improves the transmitting and receiving efficiency of the antenna module in the first frequency band, the second frequency band, the third frequency band, or the fourth frequency band.

In some embodiments, the first frequency band may be the frequency band of N3, the second frequency band may be the frequency band of N1, the third frequency band may be the frequency band of N7, and the fourth frequency band may be the frequency band of N32.

Embodiments of the present disclosure further provide a terminal device including the antenna module as described in one or more of the above-mentioned embodiments.

In the embodiments of the present disclosure, the first conductive strip and the second conductive strip are formed by the bezel at the opening for providing the functional module, to transmit and receive the radio signals, such that the bezel at the opening can be multiplexed to transmit and receive the radio signals in the case that the space is limited. More antennas can be disposed so that the antenna module may support more antenna frequency bands without disposing any separate antenna, which reduces the space of the terminal device occupied by the antenna module and improves the space utilization of the terminal device.

In some embodiments, the mobile terminal of embodiments of the present disclosure may be a wearable electronic device or a mobile terminal. The mobile terminal includes a mobile phone, a laptop or a tablet computer; and the wearable electronic device includes a smart watch or a smart bracelet, which is not limited by the embodiments of the present disclosure.

In some embodiments, the terminal device further includes: the functional module;
  the functional module is exposed by the opening in the bezel of the antenna module; and
  the functional module includes at least the key module.

The key module may be a physical key on the terminal device. The corresponding function of the key module may be implemented by triggering the key module. For example, the corresponding screen locking function of the key module is realized by pressing the key module; or, the corresponding volume increasing or decreasing function of the key module is realized by pressing the key module.

In the embodiments of the present disclosure, for example, the key module may be a conductive key such as a mechanical key or a spring-loaded touch key. The conductive key may be a key which is made of metal, alloy or electroconductive plastic and has conductive function, which is not limited by the embodiments of the present disclosure.

In the embodiments of the present disclosure, the bezel, at the opening that exposes the key module, may be multiplexed as the antenna radiator for transmitting and receiving the radio signals, enabling the bezel to dispose more antennas, and thus enabling the terminal device to support more antenna frequency bands.

In some embodiments, the functional module may further include: a card tray. The card tray is exposed by the opening in the bezel.

In some embodiments, the key module includes: a volume button for adjusting volume or a power button for powering on and off.

The above-mentioned volume button may be a volume-up button or a volume-down button, or a multi-functional button in which volume-up and volume-down are integrated. A first end of the multi-functional button may be a volume-up end and an output volume of the terminal device may increase by pressing the volume-up end; a second end of the multi-functional button may be a volume-down end and the output volume of the terminal device may decreases by pressing the volume-down end; and the second end is opposite to the first end.

In the embodiments of the present disclosure, the key module may be the volume button or the power button. In other words, in the embodiments of the present disclosure, the bezel at the opening of the volume button or the power button can be multiplexed as the antenna radiator for transmitting and receiving the radio signals. This allows the terminal device to multiplex the key module in a limited size, such that the terminal device can support more antenna frequency bands and improve space utilization of the terminal device.

It should be noted that terms "first", "second", "third", "fourth" and "fifth" in the embodiments of the present disclosure are for convenience of expression and distinction only and have no other specific meanings.

Figure 7:
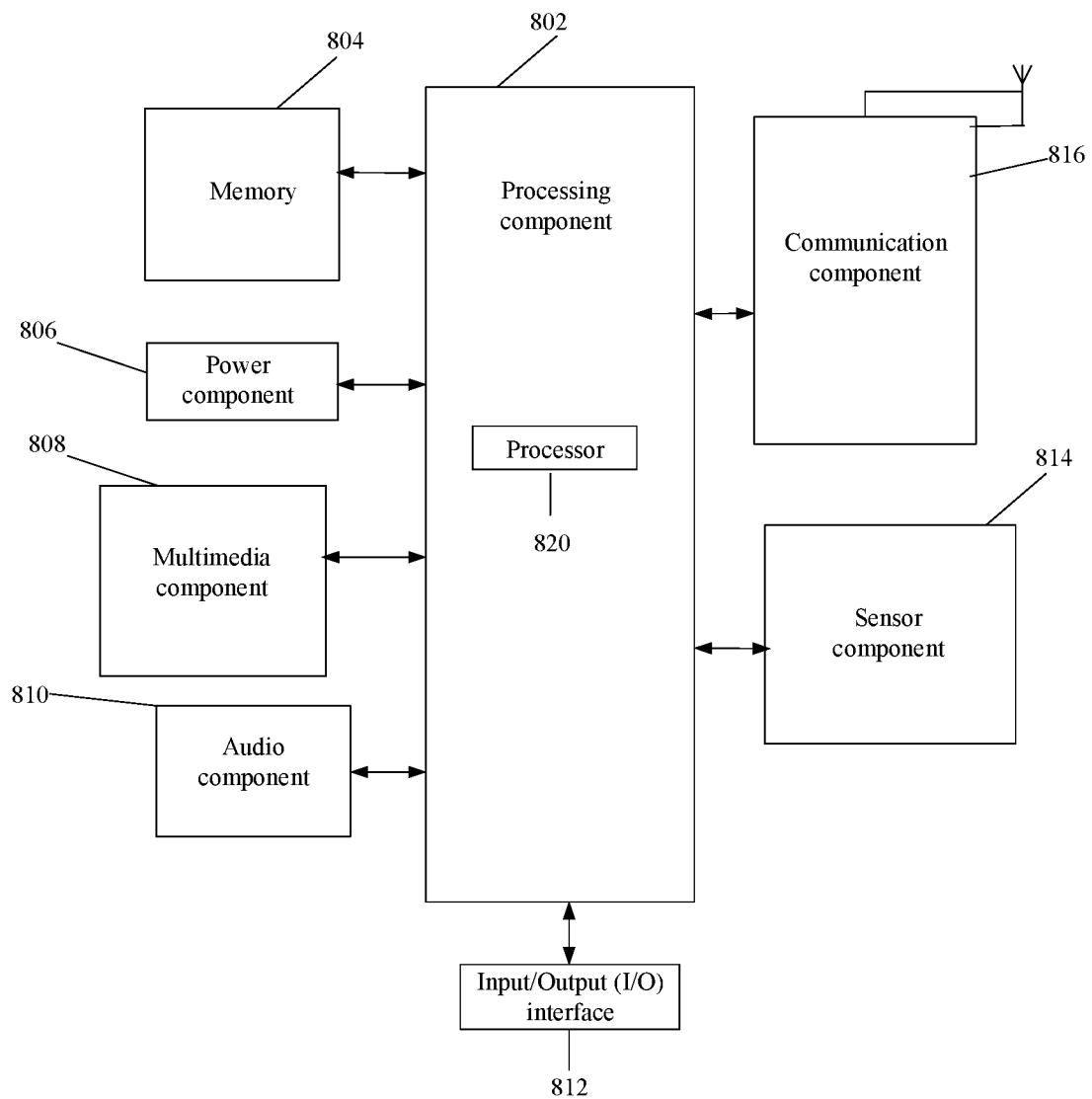
FIG. 7 is a block diagram of a terminal device according to some embodiments of the present disclosure.

FIG. 7 is a block diagram of a terminal device according to some embodiments of the present disclosure. For example, the terminal device may be a mobile phone, a computer, a digital broadcast terminal, a messaging device, a gaming console, a tablet, a medical device, exercise equipment, a personal digital assistant, etc.

Referring to FIG. 7, the terminal device may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal device, such as operations associated with display, telephone calls, data communications, camera operations, and recording operations. The processing component 802 may include one or more processors 820 to execute instructions to perform all or part of the steps in the above described methods. Moreover, the processing component 802 may include one or more modules to facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal device. Examples of such data include instructions for any applications or methods operated on the terminal device, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or optical disk.

The power component 806 provides power to various components of the terminal device. The power component 806 may include a power management system, one or more power sources, and any other components associated with the generation, management, and distribution of power in the terminal device.

The multimedia component 808 includes a screen providing an output interface between the terminal device and the user. In some embodiments, the screen may include a liquid crystal display (LCD) and a touch panel (TP). In some implementations, an organic light-emitting diode (OLED) display can be employed.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the period of time and pressure associated with the touch or swipe action. In some embodiments, the multimedia component 808 includes a front camera and/or a rear camera. The front camera and/or the rear camera may receive an external multimedia datum while the terminal device is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the terminal device is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, etc. The buttons may include, but are not limited to, a home button, a volume button, a start button, and a lock button.

The sensor component 814 includes one or more sensors to provide status assessments of various aspects of the terminal device. For instance, the sensor component 814 may detect an open/closed status of the terminal device, relative positioning of components, e.g., the display and the keypad, of the terminal device, a change in position of the terminal device or a component of the terminal device, a presence or absence of user contact with the terminal device, an orientation or an acceleration/deceleration of the terminal device, and a change in temperature of the terminal device. The sensor component 814 may include a proximity sensor configured to detect the presence of nearby objects without any physical contact. The sensor component 814 may further include a light sensor, such as a CMOS or CCD image sensor, for use in imaging applications. In some embodiments, the sensor component 814 may further include an accelerometer sensor, a gyroscope sensor, a magnetic sensor, a pressure sensor, or a temperature sensor.

The communication component 816 is configured to facilitate communication, wired or wirelessly, between the terminal device and other devices. The terminal device can access a wireless network based on a communication standard, such as Wi-Fi, 2G, 3G, 4G, 5G or 6G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, or other technologies.

In exemplary embodiments, the terminal device may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

The various device components, units, circuits, blocks, or portions may have modular configurations, or are composed of discrete components, but nonetheless may be referred to as "modules," "components" or "circuits" in general. In other words, the components, units, circuits, blocks, or portions referred to herein may or may not be in modular forms, and these phrases may be interchangeably used.

The various device components, units, blocks, portions, or modules may be realized with hardware, software, or a combination of hardware and software.

In some embodiments of the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in some embodiments of the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In some embodiments of the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or retracted from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. An antenna module, comprising:
a middle frame, wherein a bezel of the middle frame is provided with an opening for providing a functional module, the bezel is formed with a first conductive strip on one side of the opening, and the bezel is formed with a second conductive strip on another side of the opening,
wherein the first conductive strip and/or the second conductive strip is/are connected to a feed line, to be used as an antenna radiator for transmitting and receiving radio signals;
a first end of the first conductive strip is connected to a middle frame body, and a first gap is provided between a second end of the first conductive strip and the middle frame body;
a second gap is provided between a first end of the second conductive strip and the middle frame body; and
a third gap is provided between a second end of the second conductive strip and a middle frame body.

2. The antenna module according to claim 1, wherein the first conductive strip is connected to the feed line; and the second conductive strip is coupled to the first conductive strip, together to transmit and receive the radio signals.

3. The antenna module according to claim 2, wherein a projection of the first gap on the second gap at least partially coincides with the second gap.

4. The antenna module according to claim 3, wherein the first conductive strip is connected to the feed line, and a distance from a position of a connection point, at which the feed line is connected to the first conductive strip, on the first conductive strip to the first gap is one quarter of a wavelength of the radio signal of a first sub-frequency band in a first frequency band transmitted and received by the antenna module; and
a length of the first conductive strip is one quarter of a wavelength of a radio signal of a second sub-frequency band in the first frequency band transmitted and received by the antenna module.

5. The antenna module according to claim 2, wherein the second conductive strip is grounded through a tuning assembly.

6. The antenna module according to claim 5, wherein the tuning assembly comprises a switch element; and
when the switch element is in different switching states, the tuning assembly has different impedances, and the corresponding antenna module transmits and receives radio signals of different frequency bands.

7. The antenna module according to claim 6, wherein the switch element comprises: a first controlled switch, a second controlled switch, a third controlled switch and a fourth controlled switch, and the first controlled switch, the second controlled switch, the third controlled switch and the fourth controlled switch are connected in parallel between the second conductive strip and a ground line;
when the fourth controlled switch is in a turn-on state and the second controlled switch, the third controlled switch and the first controlled switch are all in a turn-off state, the tuning assembly has a first impedance, and the antenna module is configured to transmit and receive radio signals in a first frequency band;
when the first controlled switch, the second controlled switch, the third controlled switch and the fourth controlled switch are all in a turn-on state, the tuning assembly has a second impedance, and the antenna module is configured to transmit and receive radio signals in a second frequency band;
when the first controlled switch is in a turn-on state and the second controlled switch, the third controlled switch and the fourth controlled switch are all in a turn-off state, the tuning assembly has a third impedance, and the antenna module is configured to transmit and receive radio signals in a third frequency band;
when the second controlled switch is in a turn-on state and the first controlled switch, the third controlled switch and the fourth controlled switch are all in a turn-off state, the tuning assembly has a fourth impedance, and the antenna module is configured to transmit and receive radio signals in a fourth frequency band; and
when the third controlled switch is in a turn-on state and the second controlled switch, the first controlled switch and the fourth controlled switch are all in a turn-off state, the tuning assembly has a fifth impedance, and the antenna module is configured to transmit and receive radio signals in a fifth frequency band.

8. The antenna module according to claim 7, wherein the tuning assembly further comprises:
a first inductor, connected between the first controlled switch and the ground line;
a second inductor, connected between the second controlled switch and the ground line, wherein an inductance value of the second inductor is different from that of the first inductor; and
a capacitor, connected between the third controlled switch and the ground line.

9. The antenna module according to claim 5, wherein a distance from a position, at which the tuning assembly is connected to the second conductive strip, to the third gap is one quarter of a wavelength of a radio signal in a second frequency band, a third frequency band, a fourth frequency band or a fifth frequency band transmitted and received by the antenna module.

10. The antenna module according to claim 1, wherein a projection of the first gap on the second gap at least partially coincides with the second gap.

11. The antenna module according to claim 10, wherein the first conductive strip is connected to the feed line, and a distance from a position of a connection point, at which the feed line is connected to the first conductive strip, on the first conductive strip to the first gap is one quarter of a wavelength of the radio signal of a first sub-frequency band in a first frequency band transmitted and received by the antenna module; and
a length of the first conductive strip is one quarter of a wavelength of a radio signal of a second sub-frequency band in the first frequency band transmitted and received by the antenna module.

12. The antenna module according to claim 1, wherein the second conductive strip is grounded through a tuning assembly.

13. The antenna module according to claim 12, wherein the tuning assembly comprises a switch element; and when the switch element is in different switching states, the tuning assembly has different impedances, and the corresponding antenna module transmits and receives radio signals of different frequency bands.

14. The antenna module according to claim 13, wherein the switch element comprises: a first controlled switch, a second controlled switch, a third controlled switch and a fourth controlled switch, and the first controlled switch, the second controlled switch, the third controlled switch and the fourth controlled switch are connected in parallel between the second conductive strip and a ground line;

when the fourth controlled switch is in a turn-on state and the second controlled switch, the third controlled switch and the first controlled switch are all in a turn-off state, the tuning assembly has a first impedance, and the antenna module is configured to transmit and receive radio signals in a first frequency band;

when the first controlled switch, the second controlled switch, the third controlled switch and the fourth controlled switch are all in a turn-on state, the tuning assembly has a second impedance, and the antenna module is configured to transmit and receive radio signals in a second frequency band;

when the first controlled switch is in a turn-on state and the second controlled switch, the third controlled switch and the fourth controlled switch are all in a turn-off state, the tuning assembly has a third impedance, and the antenna module is configured to transmit and receive radio signals in a third frequency band;

when the second controlled switch is in a turn-on state and the first controlled switch, the third controlled switch and the fourth controlled switch are all in a turn-off state, the tuning assembly has a fourth impedance, and the antenna module is configured to transmit and receive radio signals in a fourth frequency band; and when the third controlled switch is in a turn-on state and the second controlled switch, the first controlled switch and the fourth controlled switch are all in a turn-off state, the tuning assembly has a fifth impedance, and the antenna module is configured to transmit and receive radio signals in a fifth frequency band.

15. The antenna module according to claim 14, wherein the tuning assembly further comprises:
   a first inductor, connected between the first controlled switch and the ground line;
   a second inductor, connected between the second controlled switch and the ground line, wherein an inductance value of the second inductor is different from that of the first inductor; and
   a capacitor, connected between the third controlled switch and the ground line.

16. The antenna module according to claim 12, wherein a distance from a position, at which the tuning assembly is connected to the second conductive strip, to the third gap is one quarter of a wavelength of a radio signal in a second frequency band, a third frequency band, a fourth frequency band or a fifth frequency band transmitted and received by the antenna module.

17. A terminal device, comprising: the antenna module of claim 1.

18. The terminal apparatus according to claim 17, further comprising: a functional module, wherein
   the functional module is exposed by the opening in the bezel of the antenna module; and
   the functional module comprises at least a key module.

19. The terminal device according to claim 18, wherein the key module comprises: a volume button for adjusting volume or a power button for powering on and off.

20. The terminal device according to claim 17, wherein
   the first conductive strip is connected to the feed line; and
   the second conductive strip is coupled to the first conductive strip, together to transmit and receive the radio signals; and
   the first conductive strip and the second conductive strip are formed with the bezel at the opening, such that the bezel at the opening is capable of transmitting and receiving the radio signals with a limited space of the terminal device, thereby facilitating the antenna module supporting more antenna frequency bands without a separate antenna, and reducing the limited space of the terminal device occupied by the antenna module.

* * * * *